//

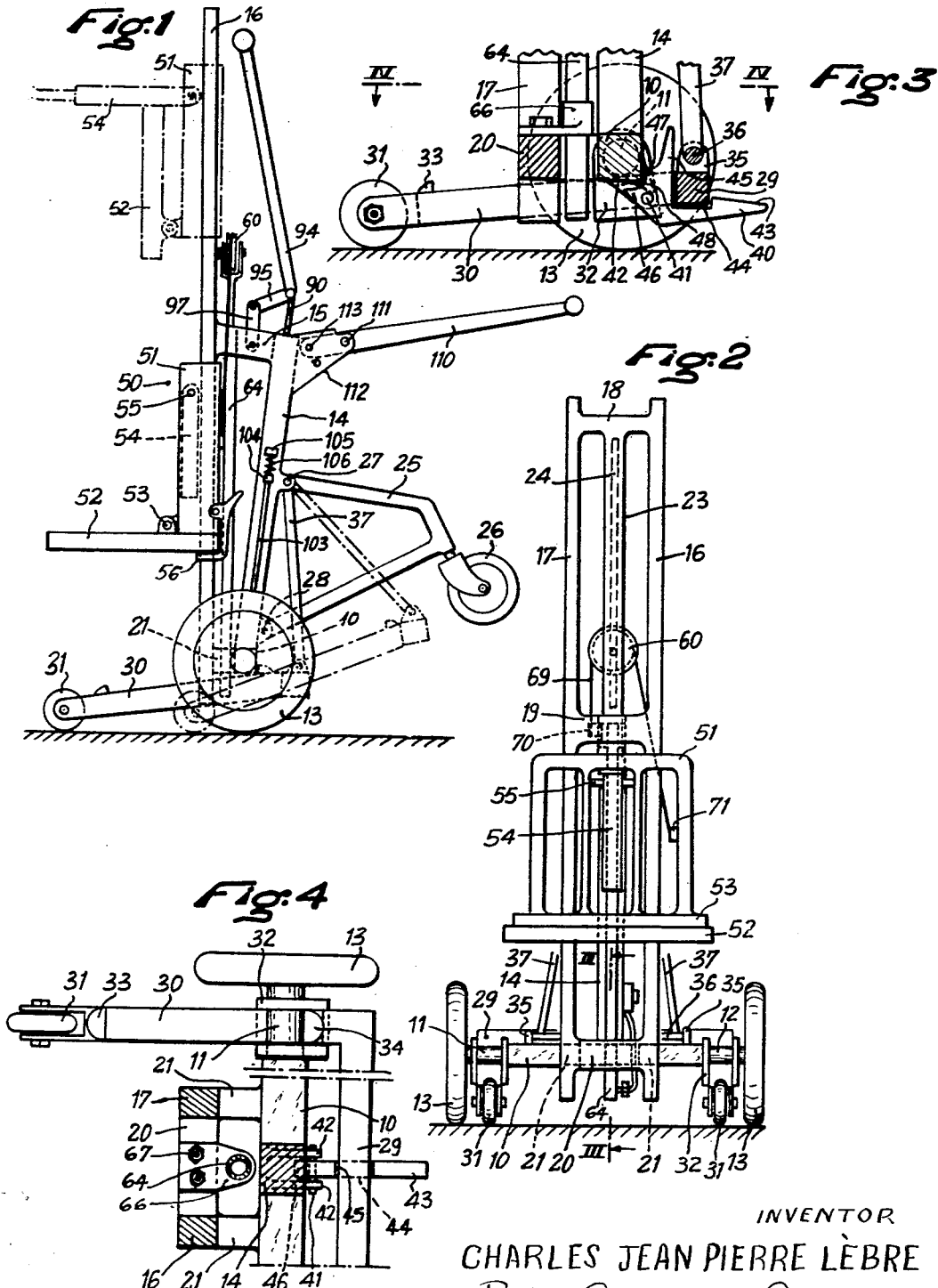

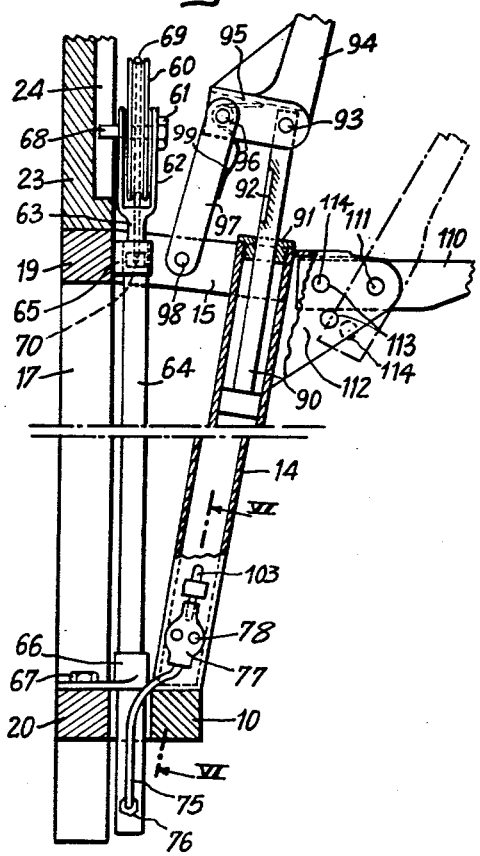
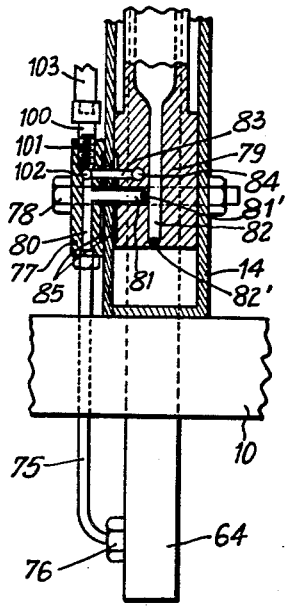
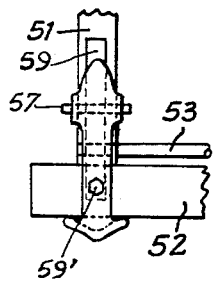
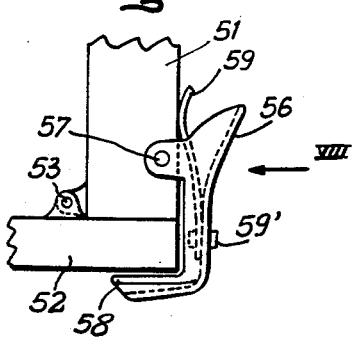
INVENTOR
CHARLES JEAN PIERRE LÈBRE

United States Patent Office 3,199,692
Patented Aug. 10, 1965

3,199,692
HAND-OPERATED LIFTING TRUCK
Charles Jean Pierre Lèbre, 35 Ave. de l'Orangerie,
Sainte-Geneviève-des-Bois, France
Filed May 8, 1964, Ser. No. 366,037
Claims priority, application France, May 11, 1963,
934,529
6 Claims. (Cl. 214—95)

The present invention relates to a hand-operated lifting truck which can be used both for lifting loads and for transporting them.

One object of the present invention is to provide a lifting truck easily operated by hand and very safe in use from the fact that the load lifted by the truck is always distributed by contact with the ground at least on three points, thus ensuring perfect stability of the lifting truck.

Another object of the present invention is to provide a lifting truck capable of charging and discharging loads by means of a lifting mechanism which is hydraulically controlled and which can be converted either into a supporting platform or a derrick.

The lifting truck according to the present invention comprises a wheeled chassis connected with forwardly placed vertical slide-bars, on which a lifting mechanism is moved vertically by means of a hydraulic driving mechanism incorporated in the chassis; the chassis includes a rear castor-wheel adapted for providing a support on the ground behind the carrying wheels when the lifting truck is moved, while a pair of balancing wheels is placed in front of the carrying wheels to form a support on the ground during the loading and unloading of the lifting truck, these balancing wheels being retractable from a position out in the front to a retracted position while remaining constantly in contact with the ground and in front of the axle of the carrying wheels. The front balancing wheels are locked in the outward position by a locking means connected with the chassis which can be manually operated in order to unlock the balancing wheels and to enable them to take up the retracted position.

This arrangement enables the lifting truck to be operated in reduced spaces and the retraction of the front balancing wheels enables the lifting mechanism of the lifting truck to approach as near as possible the load to be lifted without reducing the safe use of the truck, since it keeps four points of support on the ground.

A preferred embodiment of the lifting truck according to the invention will now be described with reference to the attached drawings.

FIGURE 1 is a side view of the whole of the lifting truck.

FIGURE 2 is a front view corresponding to FIGURE 1.

FIGURE 3 is a partial section on a larger scale made along the line III—III of FIGURE 2.

FIGURE 4 is a part section from above corresponding to FIGURE 3 and made along the line IV—IV of FIGURE 3.

FIGURE 5 is a partial section made along the longitudinal axis of the truck and showing particularly the control mechanism of the movable platform.

FIGURE 6 is a section on a larger scale along the line VI—VI of FIGURE 5.

FIGURE 7 is a view of a detail representing the locking mechanism for the movable platform, and FIGURE 8 is a view corresponding to FIGURE 7, looked at according to the arrow VIII of FIGURE 7.

The chassis of the truck consists of an axle 10, extended at each end by a stub axle 11, 12, which carries respectively the carrying wheels 13, a vertical container 14 welded in the centre of the axle 10 and intended to contain a fluid, and a vertical panel containing slide-bars connected to the top end of the reservoir 14 by a connecting strip 15. The slide-bar panel comprises two vertical slide-bars 16 and 17 cross-braced by the horizontal cross-pieces 18, 19 and 20. The intermediate cross-piece 19 is welded to the connecting strip 15 and the lower cross-piece 20 is welded to horizontal supporting connecting strips 21, themselves welded to the axle 10. Between the cross-pieces 18 and 19 extends a guiding piece 23 at an equal distance from the slide-bars 16 and 17 and provided with a vertical groove 24.

The chassis of the truck is completed at the back by a supporting frame 25 provided with a castor-wheel 26 mounted in the frame 25 through a conventional shock-absorbing means such as a spring or telescopic shaft (not shown), which enables the wheel 26 to absorb the shocks due to the unevennesses of the ground on which it runs when the lifting truck is moved. The supporting frame 25 is fixed to the reservoir 14 at 27 and 28.

In order to ensure good equilibrium for the truck when it is loaded and to increase safety during its operation, an arrangement of retractable front wheels, shown especially on FIGURES 3 and 4, has been provided, which comprises a U-shaped frame formed by a cross-piece 29 of square section parallel to the axle 10 and two arms 30 each carrying at its free end a front wheel 31. The arms 30 are able to slide simultaneously in two fork-joints 32 pivotably mounted on the stub-axles 11 and 12 respectively. The travel of the U-frame 29, 30 retractable in the fork-joints 32 is limited by the front stop 33 and back stop 34 connected to the arms 30. The cross-piece 29 is provided with two lugs 35 (see FIGURES 2 and 3) in which turns a horizontal rod 36 connected to two arms 37 which form a triangle with the rod 36, the apex of this triangle being articulated at 27 to the reservoir 14 (see FIGURE 1). This arrangement enables the frame 29, 30 to take up two positions: one position shown by a solid line in FIGURE 1, in which the front wheels 31 are in front of the carrying wheels 13 and ensure the stability of the truck, and one position shown by a broken line in FIGURE 1, in which the wheels 31 are retracted and slightly set back with respect to the carrying wheels 13 but are always in front of the axle of the latter. The arrangement ensuring the locking in the outward position of the retractable front wheels 31 and the unlocking of these wheels in order to retract them is shown on FIGURES 3 and 4, and comprises a pedal 40 placed at the centre of and under the axle 10 of the truck, this pedal 40 being articulated to the axle 10 by a spindle 41 in a fixed fork-joint 42. The pedal 40 consists of a tread 43 on which to rest the foot to make the pedal pivot, a recess 44 to receive the cross-piece 29 of the frame carrying the wheels 31, and a vertical ridge 45 which is intended to push back the rod 36 and the cross-piece 29 when one presses on the tread 43 and thus unlock the retractable frame 29, 30.

The pedal 40 also has a stop 46 which presses against the lower face of the axle 10 in order to limit the downward pivoting of the pedal when it is operated, and a boss 47 to rest against the vertical rear face of the axle 10 in order to limit the return travel of the pedal when the tread 43 is no longer pressed down. A return spring 48 fixed by one end to the spindle 41 and with its other end in contact with the lower face of the axle 10, tends to make the pedal pivot in an anti-clockwise direction, looking at the FIGURE 3. When it is desired to retract the front wheels 31 which are resting against an obstacle, it is sufficient to press on the tread 43 to make the pedal 40 swing in a clockwise direction around the spindle 41 against the action of the spring 48. The recess 44 then frees the cross-piece 29 and the vertical ridge 45 pushes back the rod 36 and the cross-piece 29 until, while the truck is still driven forward, the obstacle makes the wheels 31 retract by making the arms 30 slide in the fork-joints 32. In order to bring forward the wheels 31 again, the cross-piece 29 is pushed forward with the foot until it comes to rest in its recess 44, which ensures that the wheels 31 are locked in the outward position.

A movable member, indicated generally by 50 in FIGURE 1, is mounted on the panel containing the slide-bars 16 and 17 so that it can slide vertically. This movable member 50 consists of a vertical frame 51 provided on its rear with vertical grooves to cooperate with the slide-bars 16 and 17 and with a platform 52 joined to the frame 51 by a hinge 53 so that it can be raised in a vertical position. A derrick arm 54 articulated at 55 is placed in the plane of the vertical frame 51. This derrick arm 54 enables the movable derrick member to be used, for example, to load coils of wire, as it is shown by the broken line at the top of FIGURE 1. To do this, the derrick arm 54 is placed horizontally, and the platform 52 is lifted until it is parallel to the frame 51. The derrick arm 54 and the platform 52 are then firmly connected by a quick locking means of any suitable type (not shown).

When the movable member 50 is used as shown in FIGURE 1 by the solid line, that is, with the platform 52 horizontal then in order to manipulate and support the loads, an additional locking means is provided which enables the connection between the platform 52 and the frame 51 to be strengthened and consequently gives additional safety during the taking up and deposition of objects loaded on the platform 52.

This locking means is shown particularly on FIGURES 7 and 8 and it consists of a pawl 56 fixed pivotably round a spindle 57 to one of the outside uprights of the vertical frame 51. This pawl is bent in order to present a horizontal supporting plane 58 on which the lower face of the platform 52 comes to rest, as is shown particularly in FIGURE 7. It will be noted that, in the locked position of the pawl 56, the platform 52 cannot be folded up against the frame 51 by pivoting around the joint 53, and this constitutes an important safety measure. The pawl is kept in the position shown on FIGURES 7 and 8 by a flat spring 59 attached to the inside of the pawl by a bolt 59' and with its free end resting against the outside upright. In order to loosen the platform 52 from the frame 51, it is only necessary to press on the upper part of the pawl 56 against the action of the flat spring 59.

The vertical movement of the movable member 50 is controlled by a pulley 60 fitted so that it turns around a spindle 61 in a fork-joint 62 connected to one end of a jack rod 63 which slides in the barrel of a vertical hydraulic jack 64 parallel to the panel containing the slide-bars 16 and 17 and fixed by a collar 65 to the intermediate cross-piece 19 and by a collar 66 to the lower cross-piece 20, the collar 66 being attached by bolts 67. The jack 64 is in the same axis as the groove 24 of the guiding piece 23 of the slide-bar panel and the end 68 of the spindle 61 carrying the pulley 60 is set in this groove 24, so that when the rod 63 comes out of the jack 64, it is constantly guided and is not able to deviate from the axis of the truck. A cable 69 passes into the groove of the pulley 60 and is fixed to one end at 70 to the part 15 of the fixed chassis of the truck (see FIGURE 5), while its other end is fixed at 71 to one of the vertical uprights of the vertical frame 51 of the movable member.

The control mechanism of the jack 64 is shown particularly on FIGURES 5 and 6. The jack 64 is connected to the reservoir 14, filled with a fluid such as oil, by a pipe 75 attached to the jack 64 by a nut 76 and terminating in a valve 77 fixed against the wall of the reservoir 14 by the bolts 78. This valve 77 is connected to a pump 79 which is immersed in the fluid inside the reservoir 14 while being spaced from the bottom of this reservoir.

The valve is pierced by a longitudinal pipe 80 into which opens a feed pipe 81 for fluid for the jack 64 and a discharge pipe 83 for the jack 64, these two pipes passing through the reservoir 14 and penetrating into the pump 79. The pipe 81 communicates with an axial pipe 82 of the pump 79, while the pipe 83 communicates with a transverse passage 84 extending perpendicularly to the axial pipe 82 but without being in the same plane as the latter. The pipe 82 is open at its two ends but its lower orifice can be closed by a pressure adjusted valve represented diagrammatically by 82', while the communication between the pipe 81 and the pipe 82 is controlled by a non-return valve shown diagrammatically by 81'. When the fluid is sent into the tube 82 to feed the jack 64, the pressure of the fluid presses the valve 82' against the seating and pushes back the valve 81', which puts the pipes 82 and 81 into communication. When the pressure in the pipe 82 is reduced to zero, that is, when the jack 64 is no longer being fed, the valve 81' is applied against its seating by the action of the pressure of fluid from the pipe 81.

The transverse passage 84 opens on to the side faces of the pump and communicates with the interior of the reservoir 14. Seals 85 placed in suitable seatings of the valve body 77 and the pump 79 ensure the tightness of the device.

The fluid is pressed back from the reservoir 14 into the jack 64 by the pump 79 actuated by a piston 90 placed in the top part of the reservoir 14. This piston 90 passes through the top screwed cover 91 which closes the reservoir 14. The tightness between the piston 90 and the cover 91 must be perfect so that the oil does not flow out of the reservoir, and this tightness may be obtained by any suitable means not shown, such as a gasket. The upper part of the piston 90 has a longitudinal groove 92 which, when the piston 90 is lowered, so that the lower part of the groove penetrates into the reservoir 14, enables the interior of the reservoir to be put in communication with the atmosphere. At each movement of the piston 90 towards the bottom in order to send a certain quantity of fluid from the reservoir 14 into the jack 64, it creates a vacuum in the reservoir 14 which would prevent a good functioning of the hydraulic device. When the groove 92 puts the interior of the reservoir in communication with the atmosphere, air enters and eliminates the vacuum in the reservoir.

Of course, at rest, the groove 92 must be completely isolated from the reservoir 14 as may be seen in FIGURE 5. This is obtained by the contruction of the device described below.

The piston rod 90 is articulated at its external end at 93 to a L-shaped lever having a large operating arm 94 and a small arm 95 which are in one piece. The small arm 95 is linked by a spindle 96 to a strip 97 able to pivot around a fixed spindle 98 placed in the connecting part 15 of the chassis of the truck.

The operating arm is always brought back into the high position, as may be seen in FIGURE 5, by a return spring 99 wound round the spindle 96, one end of said spring resting on the lower surface of the small arm 95 while its other end rests against the strip 97, so that the spring 99 has a tendency to separate the arms 95 and 97 by making them pivot around the spindle 96. Thus, at rest, the piston 90 rises again into the top of the reservoir 14 and the groove 92 is isolated from the cover 91.

The hydraulic control mechanism is completed by a valve for emptying the jack 64 which consists of a screw 100 the thread of which engages with a thread 101 made in the upper part of larger diameter of the longitudinal passage 80 of the valve body 77. This screw 100 is for the purpose of locking a ball 102 on its seating, the seating being at the level of the pipe 83 so that the ball 102 closes this pipe 83.

The screwing or unscrewing of the screw 100 is effected by a rod 103 maintained along the reservoir 14 by a collar 104 and terminated by an operating knob 105. Between the operating knob 105 and the collar 104, the rod 103 is surrounded by a spring 106 which facilitates the slackening operation since it acts in the same sense (see FIGURE 1).

When it is desired to raise the movable member 50, then to operate the jack 64, it is necessary to close the pipe 83 by the ball 102 by screwing up the screw 100. The pump 79 can then be started and the jack 64 fed by moving the lever 94 downwards. When it is desired to lower the movable member 50, it is only necessary to loosen the screw 100, when the ball 102 no longer closes the pipe 83. The movable member 50 by its own weight causes the piston 63 to fall in the jack 64, which drives back the fluid into the reservoir 14 by the pipe 75, the passage 80 of the valve body and the transverse pipe 83.

Finally, it will be noted that the whole truck unit is manoeuvred and controlled by an almost horizontal control lever 110, which is articulated by a spindle 111 in a fork-joint 112 connected with the upper rear end of the reservoir 14. The side pieces of the fork-joint 112 are pierced by a series of holes 113 in the arc of a circle which enable the lever 110 to be locked in various positions intermediate between the horizontal and vertical positions. This lever 110 can be turned upwards to a vertical position so that the truck can be manoeuvred in specially narrow spaces by reducing its dimensions.

For this purpose, the inside end of the lever is provided with two retractable detents 114 which normally project and engage in the corresponding holes 113 of the fork-joint 112 so as to lock the lever 110 in a horizontal position shown by a solid line in FIGURES 1 and 5, or in an intermediate position. On pressing on these detents 114, they are released from the holes and the lever 110 can then be placed in a vertical position such as that represented by a broken line in FIGURE 5. Control of the retraction of the detents 114 can be made from a distance, from the outer end of the lever 110, for example by a trigger fixed on the lever and connected to the detents 114 by any suitable means such as a cable controlling the retraction of the detents 114 when one presses on the trigger.

I claim:

1. A hand controlled lifting truck comprising a wheeled chassis having two front carrying wheels at the ends of a transverse axle and a rear castor wheel adapted to roll on the ground when the chassis is rocked rearwards, vertical slide-bars connected with the chassis and arranged on the front thereof, a mechanism adapted to be moved along said slide-bars for lifting a load, a hydraulic control mechanism incorporated in said chassis for operating said mechanism, a frame with lateral arms slidably carried by said chassis for being movable in a substantially horizontal direction and small lateral wheels carried by the front ends of said lateral arms for ensuring a retractable additional support for the truck in the front of said front carrying wheels.

2. A hand controlled lifting truck as claimed in claim 1, comprising means for automatically locking said frame in its front position and control means for unlocking said frame in order to permit the rearward movement of said lateral wheels when the truck is pushed against an obstacle.

3. A hand controlled lifting truck as claimed in claim 1, comprising means for automatically locking said frame in its front position and spring biased pedal means for unlocking said frame in order to permit the rearward movement of said lateral wheels when the truck is pushed against an obstacle.

4. A hand controlled lifting truck as claimed in claim 1, the movable mechanism of which for lifting the load consisting of a vertical frame which slides on said vertical slide-bars and a horizontal platform pivoted to the lower part of said vertical frame.

5. A hand controlled lifting truck as claimed in claim 1, the movable mechanism of which comprises a vertical frame which slides on said vertical slide-bars, a horizontal platform pivoted to the lower part of said vertical frame and a derrick arm pivoted to the upper part of said vertical frame for being placed horizontally and locked in this position by the platform which is then turned into a vertical position.

6. A hand controlled lifting truck as claimed in claim 1 comprising a hydraulic jack, means operated by said jack and connected with said mechanism for moving said mechanism along said slide-bars, a hydraulic fluid tank, a hand operated pump arranged within said tank and supplied with fluid by said tank, a pipe connected with said jack for supplying fluid thereto and removing fluid therefrom, non return valve means between said pump and said pipe for supplying fluid into said jack, non return valve means between said pipe and said tank for removing fluid from said jack into said tank, means for selectively locking said last mentioned valve means in a closed position and unlocking it and hand controlled means for operating said pump.

References Cited by the Examiner

UNITED STATES PATENTS 2,925,999 2/60 Hopkins _____ 214—674 X
2,959,309 11/60 Hopfeld _____ 214—373

FOREIGN PATENTS 749,469 5/56 Great Britain.

HUGO O. SCHULZ, *Primary Examiner.*